United States Patent [19]

Peretti et al.

[11] Patent Number: 5,954,858
[45] Date of Patent: *Sep. 21, 1999

[54] BIOREACTOR PROCESS FOR THE CONTINUOUS REMOVAL OF ORGANIC COMPOUNDS FROM A VAPOR PHASE PROCESS STREAM

[75] Inventors: Steven William Peretti, Durham; Stuart Marc Thomas; Robert Donald Shepherd, Jr., both of Raleigh, all of N.C.

[73] Assignee: North Carolina State University, Raleigh, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/754,537

[22] Filed: Nov. 21, 1996

Related U.S. Application Data

[60] Provisional application No. 60/007,649, Nov. 22, 1995.

[51] Int. Cl.$^6$ .................................................. B01D 53/22
[52] U.S. Cl. ...................... 95/44; 95/45; 95/50; 435/266
[58] Field of Search ............................ 95/44, 45, 47–55; 435/262.5, 266

[56] References Cited

U.S. PATENT DOCUMENTS

| | | | |
|---|---|---|---|
| 4,440,853 | 4/1984 | Michaels et al. | 435/68 |
| 4,442,206 | 4/1984 | Michaels et al. | 435/68 |
| 4,481,292 | 11/1984 | Raymond | 435/147 |
| 4,553,983 | 11/1985 | Baker | 95/50 |
| 4,647,539 | 3/1987 | Bach | 435/284 |
| 4,750,918 | 6/1988 | Sirkar | 55/16 |

(List continued on next page.)

FOREIGN PATENT DOCUMENTS

| | | |
|---|---|---|
| 0 186 925 A1 | 12/1985 | European Pat. Off. . |
| 3542599 A1 | 12/1985 | Germany . |
| 63-294-903 | 12/1988 | Japan . |
| WO 94/01204 | 1/1994 | WIPO . |
| WO 95/26806 | 10/1995 | WIPO . |
| WO 95/34371 | 12/1995 | WIPO . |

OTHER PUBLICATIONS

Brookes, et al., Biotreatment of a Point–Source Industrial Wastewater Arising in 3,4–Dichloroaniline Manufacture Using an Extractive Membrane Bioreactor, *Biotechnol. Prog.*, vol. 10, pp. 65–75 (1994).

Choi, et al., A Novel Bioreactor for the Biodegradation of Inhibitory Aromatic Solvents: Experimental Results and Mathematical Analysis, *Biotechnology and Bioengineering*, vol. 40, pp. 1403–1411 (1992).

Deshusses, et al., Transient–State Behavior of a Biofilter Removing Mixtures of Vapors of MEK and MIBK from Air, *Biotechnology and Bioengineering*, vol. 49, pp. 587–598 (1996).

Freitas dos Santos, et al., Dichloroethane Removal from Gas Streams by an Extractive Membrane Bioreactor, *Biotechnol. Prog.*, vol. 11, pp. 194–201 (1995).

(List continued on next page.)

*Primary Examiner*—Robert Spitzer
*Attorney, Agent, or Firm*—Myers Bigel Sibley & Sajovec

[57] ABSTRACT

The present invention provides a method for treating volatile hazardous air pollutant (VHAP) and volatile organic compound (VOC) waste products from gas streams. The system disclosed herein employs microporous hydrophobic membranes to remove VHAPs/VOCs from a gas stream into an oleophilic stripping fluid. The stripping fluid is directed into a separate biomembrane reactor wherein the VHAPs/VOCs are transferred across a second microporous hydrophobic membrane into an aqueous nutrient medium, where the extracted VHAPs/VOCs are degraded by microorganisms residing on the surface of the membrane. VHAPs/VOCs are degraded to carbon dioxide, water, and cell debris. The disclosed system uncouples biotreatment from waste generation, such that operation of the biotreatment unit can be continuous and optimized independently of plant work schedules or fluctuations in pollutant concentrations entering the system.

34 Claims, 4 Drawing Sheets

U.S. PATENT DOCUMENTS

| | | | |
|---|---|---|---|
| 4,900,448 | 2/1990 | Bonne et al. | 95/44 |
| 4,929,357 | 5/1990 | Schucker | 95/50 X |
| 4,942,135 | 7/1990 | Zaromb | 95/45 X |
| 4,960,520 | 10/1990 | Semmens | 95/50 X |
| 4,961,758 | 10/1990 | Dobitz | 95/44 |
| 4,988,443 | 1/1991 | Michaels et al. | 210/611 |
| 5,030,356 | 7/1991 | Blume et al. | 210/640 |
| 5,135,547 | 8/1992 | Tsou et al. | 95/44 |
| 5,190,667 | 3/1993 | Jaeger | 95/45 X |
| 5,236,474 | 8/1993 | Schofield et al. | 95/50 X |
| 5,259,950 | 11/1993 | Shiro et al. | 210/490 |
| 5,281,254 | 1/1994 | Birbara et al. | 95/44 |
| 5,482,859 | 1/1996 | Biller et al. | 435/266 |
| 5,486,475 | 1/1996 | Kramer et al. | 435/266 |
| 5,498,339 | 3/1996 | Creusen et al. | 95/50 X |
| 5,582,735 | 12/1996 | Mancusi, III et al. | 95/45 X |

OTHER PUBLICATIONS

Livingston, et al., A Novel Membrane Bioreactor for Detoxifying Industrial Wastewater: I. Biodegradation of Phenol in a Synthetically Concocted Wastewater, *Biotechnology and Bioengineering*, vol. 41, pp. 915–926 (1993).

Livingston, et al., A Novel Membrane Bioreactor for Detoxifying Industrial Wastewater: II. Biodegradation of 3–Chloronitrobenzene in an Industrially Produced Wastewater, *Biotechnology and Bioengineering*, vol. 41, pp. 927–936 (1993).

Baker, et al., Separation of Organic Vapors from Air, *Journal of Membrane Science*, vol. 31, pp. 259–271 (1987).

Brindle, et al., The Application of Membrane Biological Reactors for the Treatment of Wastewaters, *Biotechnology and Bioengineering*, vol. 49, pp. 601–610 (1996).

Beeton, et al., Gas Transfer Characteristics of a Novel Membrane Bioreactor, *Biotechnology and Bioengineering*, vol. 38, pp. 1233–1238 (1991).

Debus, et al., Degradation of Xylene by a Biofilm Growing on a Gas–Permeable Membrane, *Wat Sci. Tech.*, vol. 26, No. 3–4, pp. 607–616 (1992).

Horn, et al., Mass Transfer Coefficients for an Autotrophic and a Heterotrophic Biofilm System, *Wat. Sci. Tech.*, vol. 32, No. 8, pp 199–204 (1995).

Inloes, et al., Ethanol Production by *Saccharomyces cerevisiae* Immobilized in Hollow–Fiber Membrane Reactors, *Applied and Environmental Microbiology*, vol. 46, No. 1, pp. 264–278 (Jul., 1983).

Karoor, et al., Gas Absorption Studies in Microporous Hollow Fiber Membrane Modules, *Ind. Eng. Chem. Res.* vol. 32, pp. 674–684 (1993).

Livingston, et al., Degradation of 3,4–Dichloroaniline in Synthetic and Industrially Produced Wastewaters by Mixed Cultures Freely Suspended and Immobilized in a Packed–Bed Reactor, *Appl. Microbiol. Biotechnol.*, vol. 35, pp. 551–557 (1991).

Qi, et al., Microporous Hollow Fibers for Gas Absorption I. Mass Transfer in the Liquid, *Journal of Membrane Science*, vol. 23, pp. 321–332 (1985).

Qi, et al., Microporous Hollow Fibers for Gas Absorption II. Mass Transfer Across the Membrane, *Journal of Membrane Science*, vol. 23, pp. 333–345 (1985).

Sirkar, et al., Removal of VOCs from Waste Gas Streams by Permeation in a Hollow Fiber Permeator, Abstract, 1996 Annual Meeting of the American Institute of Chemical Engineers held on Nov. 12, 1996.

Stern, et al., Polymers for Gas Separations: The Next Decade, *Decade of Membrane Science*, vol. 94, pp. 1–65 (1994).

Tompkins, et al., Removal of p–nitrophenol from Aqueous Solution by Membrane–Supported Solvent Extraction, *Journal of Membrane Science*, vol. 75, pp. 277–292 (1992).

Wilderer, Technology of Membrane Biofilm Reactors Operated Under Periodically Changing Process Conditions, *Wat Sci. Tech.*, vol. 31, No. 1, pp. 173–183 (1995).

BIOREACTOR PROCESS FOR THE CONTINUOUS REMOVAL OF ORGANIC COMPOUNDS FROM A VAPOR PHASE PROCESS STREAM

RELATED APPLICATIONS

This application claims the benefit of U.S. Provisional application Ser. No. 60/007,649 filed Nov. 22, 1995.

FIELD OF THE INVENTION

The present invention relates to methods for the treatment of volatile hazardous air pollutant and volatile organic compound waste products. More specifically, the present invention provides methods for the separation and biodegradation of volatile hazardous air pollutants and volatile organic compounds found in the gas exhaust streams generated by many manufacturing processes.

BACKGROUND OF THE INVENTION

Manufacturing operations are increasingly faced with the difficult task of reducing emissions of volatile hazardous air pollutants (VHAPs) and volatile organic compounds (VOCs) from their production facilities in order to achieve compliance with stringent regulations promulgated by the United States Environmental Protection Agency. The costs associated with direct treatment of exhaust streams by conventional technologies (such as thermal oxidation, catalytic oxidation, carbon absorption, or liquid absorption) in many cases make conventional technologies unattractive. Adsorption of VHAPs/VOCs with activated carbon or zeolite may provide some cost savings, but these technologies require that the adsorption material be regenerated and/or disposed of, raising costs to approximately the same levels as thermal or catalytic oxidation. The technology disclosed herein will be more cost-effective than other technologies, because of reduced treatment volume and low operating costs.

Recently, biofiltration has emerged as an alternative to conventional VHAP/VOC treatment technologies. In general, biotreatment provides a cost-effective and efficient means of destroying organic pollutants. There are no fuel requirements as in thermal/catalytic oxidation units, and there are no hazardous discharges from the reactor system. Pollutants are consumed by resident microorganisms as food for growth and energy. However, biofilters suffer from the same difficulties as other control technologies when considered for application to most manufacturing processes. A typical biofilter requires a bed volume roughly equal to the air flow which it must treat. Therefore, a biofilter which will process 300,000 CFM air requires about a 300,000 ft$^3$ bed volume. The tremendous size of these units places capital costs in the three to seven million dollar range with estimated annual expenses between $650,000 and $2.5 million.

Biofilter size requirements arise from the fact that they directly treat air emissions. This means that units are sized for air flow, not pollutant loading. Also, successful application of a biofilter requires that pollutants have sufficient opportunity to be absorbed/adsorbed by the packing material. Because the local bed environment is aqueous, water soluble compounds (e.g., alcohols, ketones) are removed from an air stream more efficiently than non or slightly soluble compounds (e.g., toluene, xylene). This limitation has a negative impact on the efficiency of treating aromatic pollutants.

Methods for extracting pollutants from waste water and gases for biodegradation are known in the art.

Brookes et al., *Biotechnol. Prog.* 10, 65–75 (1994), discloses an extractive membrane bioreactor system for treating waste water containing chloroanilines. The extractor unit is comprised of a shell containing silicone rubber tubes, which act as the extractive membrane. The outflow from the extraction unit is directed into a fermentor that serves as the bioreactor. A stream of water containing chloroanilines is put through the membrane extraction unit, where the chloroanilines are extracted across the silicone rubber tubes into an aqueous biomedium, which is then fed into the bioreactor for degradation.

U.S. Pat. No. 4,988,443 to Michaels et al. teaches methods and apparatus for continuously removing organic toxicants or other oleophilic solutes from waste water. The process employs hydrophobic hollow fiber membranes in a flow reactor to remove organic toxicants from a liquid stream. The organic toxicants in the liquid process stream are selectively transported across the hollow fiber membrane, where they are degraded by resident microorganisms into water soluble metabolites.

Livingston, *Biotechnol. Bioeng.* 41, 915–26 (1993), discloses a membrane bioreactor unit for removing and biodegrading phenol in waste water. The membrane bioreactor unit is a glass tube containing an aqueous biological growth medium. A silicone rubber tube wrapped around a stainless-steel mesh support is placed therein. The silicone rubber tube acts as a membrane to remove phenol from waste water. Waste water containing phenol is pumped through the silicone rubber coil. Phenol diffuses across the membrane coil, into the aqueous biological growth medium, where degradation occurs by microorganisms residing in the bulk fluid and in a biofilm on the outside of the silicone rubber membrane. In a companion article, Livingston, *Biotechnol. Bioeng.* 41, 927–36 (1993), disclosed the use of the same bioreactor unit to remove and biodegrade 3-chloronitrobenzene from waste water.

Choi et al., *Biotechnol. Bioeng.* 40, 1403–1411 (1992), teach a method of biodegrading aromatic solvents in waste water. The biotreatment unit is comprised of a silicone tube immersed in an aerated bioreactor. Liquid toluene is circulated within the tube. The toluene diffuses out of the tube into the aqueous culture medium where it is aerobically degraded by microorganisms.

Deshusses et al., *Biotechnol. Bioeng.* 49, 587–598 (1996), disclose the use of a biofilter to remove methyl ethyl ketone (MEK) and methyl isobutyl ketone (MIBK) vapors from air. The microorganisms in the biofilter are immobilized to an inert material comprising compost and polystyrene spheres packed into an acrylic glass column. Compressed humidified air streams are sparged with either MEK or MIBK and then passed through the biofilter column, where resident microorganisms degrade the MEK/MIBK in the humidified air stream.

Deshusses et al. further examine the transient-state performance of the biofilter in response to perturbations. They observed that the biofilter experiences a 4.5 day acclimation period after initial start-up before attaining full removal efficiency. In addition, these investigators reported that step changes in MEK or MIBK inlet concentrations or gas flow rate cause disruptions in the system resulting in a 2–5 hour lag before a new steady-state is achieved. Experiments in which the biofilter was pulsed with high concentrations of MEK or MIBK resulted in transient "break through" of pollutant into the effluent, indicating the biofilter is unable to respond to rapid increases in pollutant concentrations. Finally, the effects of starvation on biofilter performance was assessed. After a 5-day starvation period, the biofilter experienced a performance lag of several hours after the system was restarted.

Freitas dos Santos et al., *Biotechnol. Prog* 11, 194–201 (1995), teach a method for removing dichloroethane (DCE) from a gas stream using a membrane bioreactor system. DCE is extracted across a hydrophobic dense phase silicone rubber membrane where it is then degraded by a biofilm attached to the membrane. These investigators note that biofilm growth on the membrane limits removal efficiency; the biofilm reduces the cross-sectional area for fluid flow, which results in a reduced mass transfer of DCE across the membrane.

In view of the foregoing there is a need for improved systems for biotreating volatile organic pollutants in gas exhaust streams.

SUMMARY OF THE INVENTION

We have developed a unique system for removing and biodegrading volatile hazardous air pollutant and volatile organic compound waste products from gas streams.

The present invention is a process for removing a volatile organic compound from a gas stream, this process comprising: (a) providing a gas stream containing a volatile organic compound therein to a separation module, where the separation module has a gas stream inlet opening, a gas stream outlet opening, and a gas stream channel therebetween, with the separation module containing a first microporous hydrophobic membrane; (b) extracting the volatile organic compound across a first microporous hydrophobic membrane into a lean stripping fluid to produce a loaded stripping fluid; (c) providing the loaded stripping fluid to a treatment module, the treatment module comprising a second microporous hydrophobic membrane having first and second opposing surface portions, with the loaded stripping fluid contacting the first surface portion, and with microorganisms immobilized on the second surface portion, the treatment module having a nutrient medium inlet opening and a nutrient medium outlet opening formed therein, a nutrient medium being provided to the microorganisms in the treatment module by the nutrient medium inlet opening; (d) extracting the volatile organic compound from the loaded stripping fluid across the second microporous hydrophobic membrane to the microorganisms to produce a lean stripping fluid; (e) degrading the extracted volatile organic compound with the microorganisms.

The present invention provides methods for the separation and biotreatment of VHAPs/VOCs. The approach is comprised of two steps. First, pollutants in the gas waste stream are transferred into a stripping fluid (solvent) with the gas-liquid interface stabilized by a membrane. Once concentrated in the solvent, the pollutants are delivered to a bioreactor unit where they are degraded by resident microorganisms. The combination of membrane separation/concentration and biodegradation have led to the name Membrane Biotreatment (MBT) for this technology.

The foregoing and other objects and aspects of the present invention are explained in detail in the drawings herein and the specifications set forth below.

DETAILED DESCRIPTION OF THE INVENTION

As used herein, "$\mu$m" means micrometer, "psi" means pounds per square inch, "kPa" means kiloPascals, and "ppm" stands for parts per million (mole/mole).

In an effort to expand the resources available to manufacturers for compliance with current and future emissions rules, the control technology disclosed herein was developed. The technology disclosed herein, known as Membrane Biotreatment (MBT), will allow removal and destruction of VHAPs/VOCs while preserving manufacturing flexibility and product quality. An overview of the MBT System is shown in FIG. 1.

Figure 1:
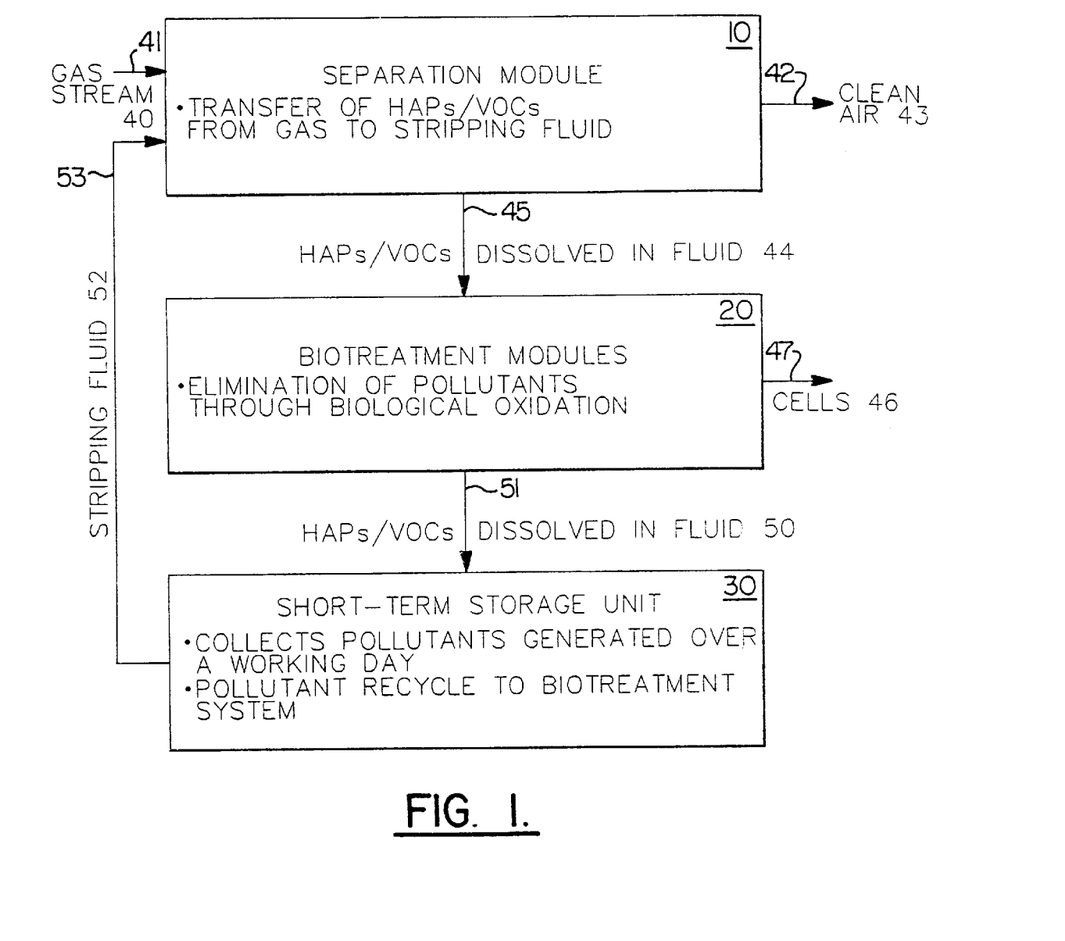
FIG. 1 provides an overview of the MBT System.

As illustrated in FIG. 1, a gas stream 40 is fed by line 41 into a separation module 10, wherein VHAPs/VOCs are transferred from the gas stream into a stripping fluid. Clean air 43 exits the separation module by line 42. The VHAPs/VOCs in the stripping fluid 44 are delivered by line 45 to a biotreatment module 20, where the pollutants are eliminated by biological oxidation by the resident microorganisms. Cells 46 exit the biotreatment module 20 by line 47 through shear and sloughing off. In one embodiment, a portion of the VHAPs/VOCs in the stripping fluid 50 bypasses biological oxidation in the biotreatment module 20 and is delivered by line 51 to a short-term storage unit 30, which collects pollutants generated during processing and recycles pollutants through the biotreatment system. Stripping fluid 52, with or without stored VHAPs/VOCs 50, is delivered back to the separation module 10 via line 53.

The MBT System is divided into two related but separate parts. The first process removes and concentrates VHAPs/VOCs. The second process transforms these pollutants into biomass. In addition, a storage vessel provides short term storage for VHAPs/VOCs. By employing two distinct steps in the processing of exhaust gases and providing a means of storage of extracted VHAPs/VOCs, pollutant generation is uncoupled from destruction and/or recovery, allowing the processes to operate independently of manufacturing schedules and at optimal levels. This effectively removes many of the limitations of control technologies which provide direct treatment, and it reduces the size and cost of the overall system. In addition, there are no significant mechanical work or heating requirements, which keeps operating costs low.

Figure 2:
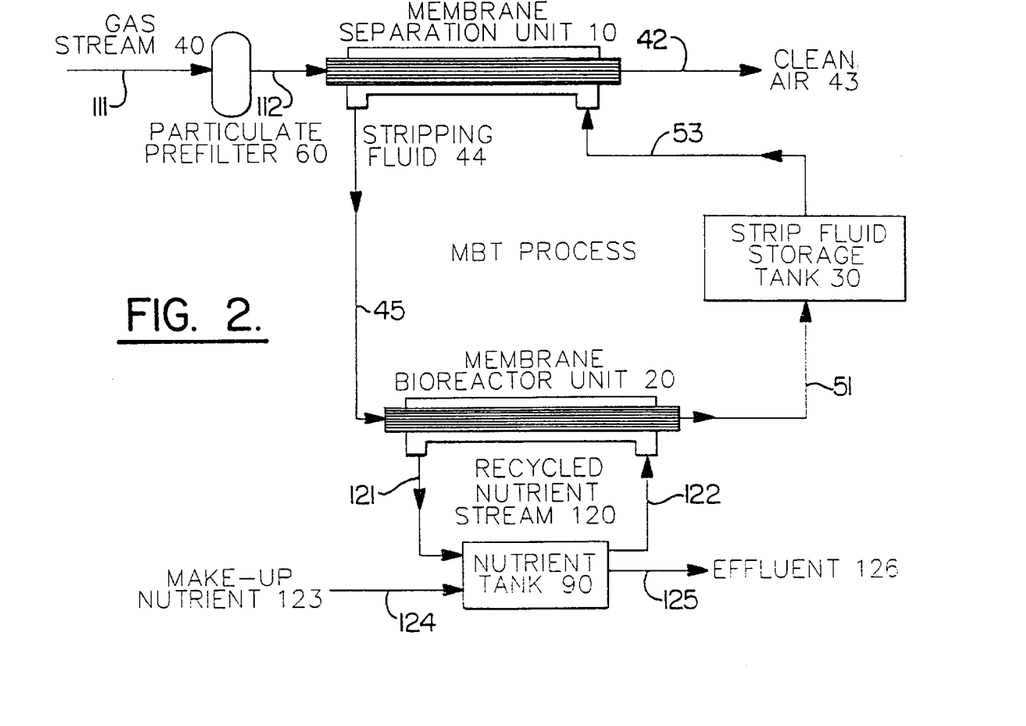
FIG. 2 is a schematical representation of the MBT System.

A schematic of one embodiment of the MBT System is shown in FIG. 2. Turning to FIG. 2, the gas stream 40 first passes through line 111 to a particulate prefilter 60, which removes residual atomized droplets (either liquid or solid) of coatings or solvents. The particulate prefilter may be a membrane filter, adsorber, fabric filter, polymer filter, or scrubber. Next, the gases enter a membrane separation unit 10 by line 112. The membrane separation unit 10 employs bundles of microporous hydrophobic membranes, such as Hoechst Celanese polypropylene CELGARD® membrane material packaged into LIQUI-CEL® units. Clean air 43 exits the membrane separation unit 10 by line 42. A stream of stripping fluid 44 flows through the membrane separation unit 10 and is then directed by line 45 to a membrane bioreactor unit 20. In this particular embodiment, the stripping fluid exits the membrane bioreactor unit 20 and is fed by line 51 into a storage tank 30. The stripping fluid leaves the storage tank 30 by line 53 and is fed back into the membrane separation unit 10. A recycled nutrient stream 120 is fed into the membrane bioreactor unit 20 by line 122 from a nutrient tank 90. The recycled nutrient stream 120 is brought back to the nutrient tank 90 by line 121 after flowing through the membrane bioreactor unit 20. Make-up nutrient 123 is fed into the nutrient tank 90 by line 124 to replenish the nutrient supply. Effluent 126 exits the nutrient tank 90 by line 125.

In one embodiment of the invention, a single separation module is connected to a single biomembrane reactor. It will be appreciated by those skilled in the art that other embodiments may be used in a particular application of the present invention. In one alternate embodiment, multiple separation modules, each processing a different gas stream, feed into a single biomembrane reactor. As another alternative, a single separation module may feed into two or more biomembrane reactors. Preferably the multiple biomembrane reactors are arranged in a serial configuration. In this particular embodiment, each biomembrane reactor houses a different microorganism or mixture of microorganisms, each having distinct substrate preferences. The loaded stripping fluid is directed serially through the multiple biomembrane reactors to achieve more complete degradation of the volatile organic compounds contained therein. As a further alternative, multiple separation modules feed into multiple biomembrane reactors, where the biomembrane reactors are preferably arranged in a serial configuration.

Figure 3:
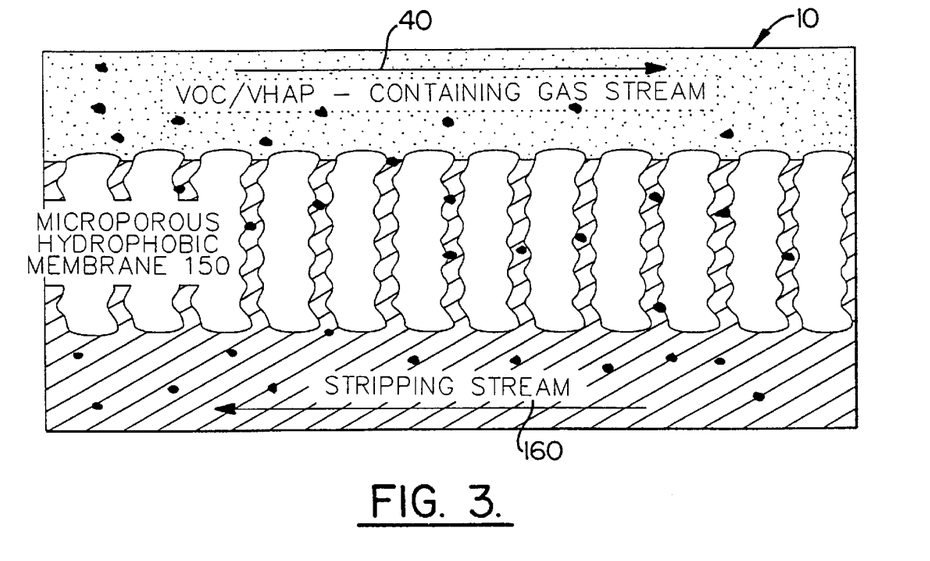
FIG. 3 illustrates an enlargement of the solvent-gas interface in a microscopic section of a microporous hydrophobic membrane in the separation module.

FIG. 3 is an enlargement of a cross-section of one embodiment of the separation module 10. As illustrated in FIG. 3, transfer of VHAPS/VOCs from the gas stream to the stripping fluid occurs in the separation module. A gas containing VHAPs/VOCs 40 passes over one surface of the microporous hydrophobic membrane 150. VHAPs/VOCs are extracted into a stripping fluid 160 held in the pores of the microporous hydrophobic membrane 150. The pollutants diffuse through the membrane pores into a stripping fluid stream 160 (e.g., octanol, mineral oil, sunflower seed oil, polyethylene glycol, or other high molecular weight organic) flowing on the other side of the membrane.

Figure 4:
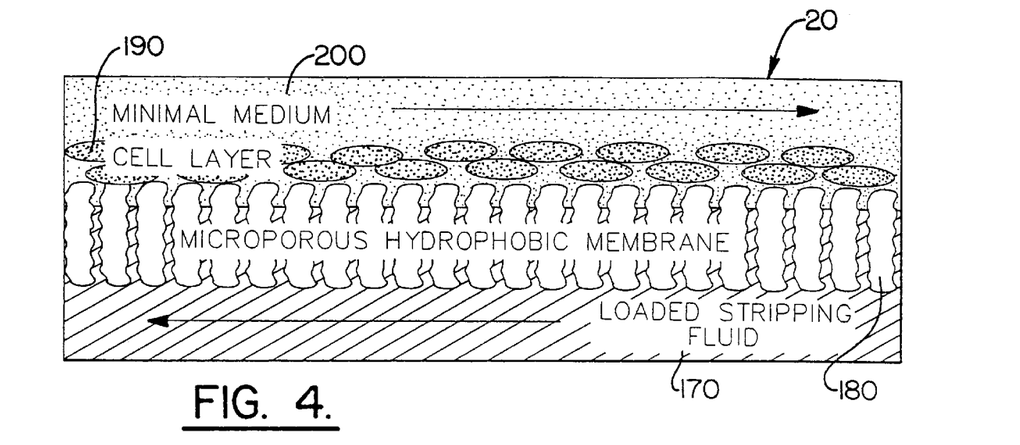
FIG. 4 illustrates an enlargement of the interface between the loaded stripping fluid and immobilized cells in a microscopic section of the microporous hydrophobic membrane in the biomembrane reactor.

The stripping fluid medium serves as a pollutant sink and allows accumulation of significant VHAP/VOC concentrations. Upon exiting the separation module, the stripping fluid bearing VHAPs/VOCs is directed to a biomembrane reactor 20. FIG. 4 illustrates an enlargement of a cross-section of one embodiment of the biomembrane reactor. Turning to FIG. 4, the loaded stripping fluid 170 flows over one surface of the microporous hydrophobic membrane 180. A cell layer 190 is grown on the other side of the membrane, over which flows a stream of an aqueous minimal growth medium 200. VHAPs/VOCs are extracted across the microporous hydrophobic membrane 180, where they are converted by the microorganisms to carbon dioxide, water, and cell mass. In one embodiment of the invention, after exiting the biomembrane reactor, the stripping fluid 170 is collected in a storage vessel, and is ultimately recycled through the separation module.

The foregoing and other aspects of the present invention are explained in greater detail below.

Pertraction.

Membrane mediated separations of organic vapors from a gas have traditionally employed nonporous semipermeable membranes which are similar to the ones described herein. In pertraction, a liquid solvent phase and a gas phase are present on opposite sides of the membrane. The polymeric materials of construction have molecular level affinity for the vapors to be removed from the gas stream, and are selectively permeable to these compounds. Examples of such polymeric materials include, but are not limited to, poly [1-(trimethylsilyl)-1-propyne], poly(dimethylsiloxane), poly (dimethyl silmethylene), poly(cis-isoprene), poly (butadiene-styrene), ethyl cellulose, polystyrene, poly(ethyl methacrylate), bisphenol-A polycarbonate, cellulose acetate, bisphenol-A polysulfone, PMDA-4-4'-ODA polyimide, and poly(methyl methacrylate).

During pertraction, a mixture of gases contacts one side of the membrane, and the different compounds in the gas mixture (e.g., ketones, aromatics, alcohols, organic acids) move through the polymer at different rates, yielding a solvent stream of different solute proportions on the stripping side of the membrane. The general result is a concentration in the strip stream of either a single compound or a class of compounds (e.g., xylene, ethanol, aliphatic compounds, aromatic compounds).

Membrane Supported Extraction.

Membrane supported extraction is a relatively new technique where a microporous membrane is used to support a liquid—liquid or gas-liquid interface. Membrane supported extraction is most commonly performed in hydrophobic membranes. In a hydrophobic membrane, the solvent phase wets the pores. Applying an over-pressure to the nonsolvent phase forces the interface inside the membrane pore such that it is unaffected by the adjacent flow rates.

The selectivity of membrane supported extraction is derived from the unique partitioning behavior of each component in the waste stream. With a proper choice of solvent, a specific pollutant(s) may be isolated from other compounds present in the waste stream. Transfer is accomplished by the diffusion of the solute from one phase to another through the solvent filled membrane pores.

The present invention provides a method of using membrane supported extraction to transfer volatile organic compounds from an exhaust gas to a liquid stripping fluid stream which ultimately feeds the biotreatment process. Volatile organic compounds are transferred from the gas phase into the stripping fluid based upon the fact that, at equilibrium, they preferentially partition into the stripping fluid. Concentration of the organic compounds in passing from vapor to liquid might also occur, resulting in volume reduction. Exit streams from the separation process consist of clean air and a liquid phase which is ultimately bound for biotreatment.

A gas stream is the gaseous emission from a manufacturing process. Preferably, such gas streams are generated by surface-coating operations, such as furniture finishing, plywood and particle board manufacturing, more preferably furniture surface-coating operations. Hazardous gas streams are also produced from processes for metal coating, foamed polymer manufacture, fabric dying and coating, solvent cleaning, injection molding and polymer extrusion, polymeric fiber production, pulp and paper manufacture, chemical production, petroleum production, and wood preservative treatment. Alternatively, a gas stream may be a soil. venting gas. As a further alternative, a gas stream may arise from a liquid waste, i.e., when a liquid waste is vaporized before treatment. Still further, a gas stream may be produced by an agricultural facility, such as hog and chicken operations.

By organic compound it is meant any carbon-based compound. An organic compound may be in an aromatic or aliphatic form. Organic compounds of interest in the practice of the present invention include, but are not limited to, acetones, anilines, benzene, butanol, 2-butoxyethanol, diethylene glycol monoethyl ether, ethanol, ethyl benzene, ethylene glycol, formaldehyde, isobutyl acetate, isobutyl isobutyrate, isopropanol, methanol, methyl ethyl ketone, methyl isobutyl ketone, methyl n-amyl ketone, naptha compounds, toluene, and xylene. An organic compound as used herein also includes nitrated organic compounds and chlorinated organic compounds.

A volatile organic compound is any hydrocarbon, except methane and ethane, with a vapor pressure equal to or greater than 0.1 mm of mercury at 25° C. Alternatively, a volatile compound is one that readily passes off by evaporation. One or a mixture of two or more such volatile organic compounds may be present in any particular gas stream to be treated by the present invention. Furthermore, as used herein, the phrase "process for removing a volatile organic compound from a gas stream" describes a process whereby one or a mixture of two or more volatile organic compounds are removed from a gas stream.

There is no particular lower limit to the concentration of volatile organic compounds in the gas stream that can be effectively treated by the practice of the present invention. The present invention can be used to treat volatile organic compounds at concentrations as low as 300, 200, 100, 50, 10, or 1 ppm (mole/mole) in the gas stream. Likewise, there is no particular upper limit to the concentration of volatile organic compounds that can be effectively treated, with concentrations of 500, 750, 1000, 2000, 5000, 10,000, or 20,000 ppm (mole/mole) in the gas stream being acceptable.

A separation module is a shell-like structure with inlet and outlet openings for a gas stream and a stripping fluid. The separation module contains a membrane composed of microporous hydrophobic polymeric materials, e.g., polyethylene, polypropylene, polyethylene terephthalate. It will be understood by those skilled in the art that the foregoing list of materials is merely exemplary and that any hydrophobic polymeric material can be utilized. The membranes can be composed of hollow fibers or flat sheets.

In one embodiment of the invention, the stripping fluid stream occupies the space inside a hollow fiber membrane and the gas stream occupies the shell-space outside the membrane. Alternately, the phases can be reversed and the gas can occupy the space inside the hollow fiber membrane and the stripping fluid stream occupies the shell space. In another embodiment of the invention, the stripping fluid occupies the space on one side of a flat sheet membrane, and the gas stream occupies the other side of the membrane. In any of these embodiments, there is a gas-liquid interface between the gas stream and the stripping fluid within the pores of the microporous membrane.

In a preferred embodiment of the invention, the separation module employs Hoechst Celanese LIQUI-CEL® units, which contain CELGARD® membranes. (The LIQUI-CEL® Extra-flow 2.5"×8" Membrane Contactor can be ordered from Hoechst Celanese Corp., Separations Products Division, 13800 South Lakes Drive, Charlotte, N.C.; telephone: (800) 235-4273 or (704) 588-5310.)

In another preferred embodiment of the invention, one of the membrane surfaces is coated with a nonporous semipermeable membrane. Preferably, the membrane surface that contacts the gas stream is coated. Acceptable nonporous semipermeable membranes include those composed of polymers. Such polymers include, but are not limited to, silicone rubber (polydimethyl siloxane), polyvinyl chloride, nitrile rubber, neoprene, and silicone polycarbonate.

Figure 5:
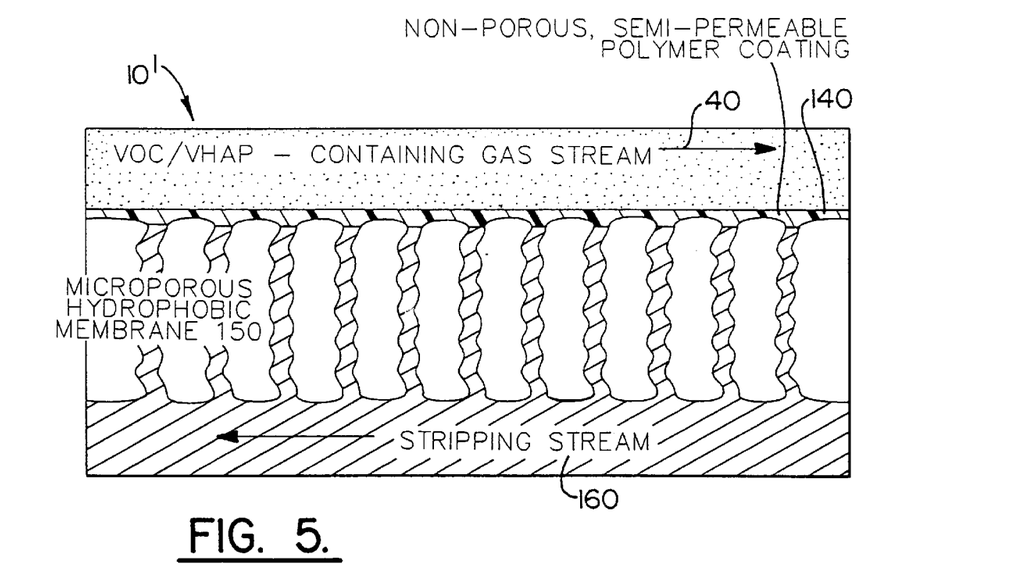
FIG. 5 illustrates an enlargement of a separation module containing a microporous hydrophobic membrane coated with a nonporous semipermeable membrane.

FIG. 5 illustrates an enlargement of a cross-section of the separation module 10' used in this embodiment of the invention. The gas stream containing VHAPs/VOCs 40 passes over the surface of the microporous hydrophobic membrane 150 that is coated with a nonporous semipermeable membrane 140. VHAPs/VOCs are transferred across the microporous hydrophobic membrane 150 into a stripping fluid stream 160 (e.g., octanol, mineral oil, sunflower seed oil, polyethylene glycol, or other high molecular weight organic) flowing on the other side of the membrane. While not wishing to be bound by any particular theory of the invention, it is believed that transfer of volatile organic compounds across coated membranes occurs by a combination of pertraction and diffusion; the volatile organic compounds cross the nonporous semipermeable membrane by pertraction and then cross the microporous hydrophobic membrane by diffusion through the pore-filling liquid.

Exemplary effective pore sizes for the microporous membranes in the separation module are 0.01 to 0.1 $\mu$m, more preferably 0.02 to 0.06 $\mu$m. There are competing considerations in selecting the pore size of the microporous membrane. Increasing pore size enhances flux of the volatile organic compounds from the gas to the liquid phase. Large pores can be problematic with uncoated microporous membranes, however, because as pore size increases a greater over-pressure must be applied to the gas phase to retain the liquid phase within the membrane pores. Insufficient over-pressure can result in membrane unit flooding, requiring unit shut-down and cleaning.

Over-pressure is applied to the gas phase so as to stabilize the gas-liquid interface within the membrane. There is no particular lower or upper limits to the over-pressure that can be applied to the gas stream to achieve this end. Over-pressure may be as low as 5, 4, 3, or 2 psi (34, 28, 21, or 14 kPa) or lower. Likewise, over-pressures of 5, 6, 7, or 10 psi (34, 41, 48, or 69 kPa) are acceptable.

The necessity of providing an over-pressure to retain the liquid phase within the microporous membrane is avoided if one of the membrane surfaces, preferably the surface that contacts the gas phase, is coated with a nonporous semipermeable membrane. Because of its nonporous nature, the membrane acts as a seal, and the liquid phase cannot break through the membrane. As a result, no over-pressure and larger effective pore sizes are possible with such coated membranes. Exemplary effective pore sizes for coated membranes are 0.01 to 0.45 $\mu$m, preferably 0.03 to 0.3 $\mu$m, more preferably 0.03 to 0.2 $\mu$m.

As used herein "removing a volatile organic compound from a gas stream" refers to the extraction of one or a mixture of two or more volatile organic compounds from a gas stream and the subsequent degradation of the volatile organic compound(s) by the microorganisms in the biomembrane reactor. Mass transfer of organic compounds across the hydrophobic microporous membrane is a function of flow rate and pollutant concentration in both the gas stream and the solvent. Extraction efficiencies in the separation module in excess of 98% (w/v) have been achieved in the present investigations. One skilled in the art will appreciate that in light of operational and economic considerations, it may be preferable to run the system so as to achieve lower extraction efficiencies. It is envisioned that the present invention will be used so as to achieve extraction efficiencies as high as 80%, 85%, 90%, 95%, or 98% (w/v) or higher. The system may also be run so as to achieve extraction efficiencies as low as 75%, 70%, 60%, or 50% (w/v) or lower.

In the separation module, vaporized VHAPs/VOCs are transferred from the gas stream into a stripping fluid medium. The stripping fluid is any solvent into which the pollutant can be extracted. The choice of solvent for the stripping fluid is a trade-off between high affinity for VHAPs/VOCs and solubility in the aqueous medium of the biomembrane. High solubility of the stripping fluid in the aqueous phase of the biomembrane will result in significant losses of solvent, thereby increasing the operating costs. The stripping fluid should also be relatively inexpensive and available in bulk quantities. An additional consideration is that the solvent should not impede degradation of VHAPs/VOCs in the biomembrane reactor. Finally, toxicity of the stripping fluid should be minimized so as to reduce the risk associated with accidental release into the environment. The stripping fluid is preferably composed of an oleophilic solvent, i.e., a solvent in which fats or oils dissolve. Illustrative oleophilic solvents include, but are not limited to, octanol, mineral oil, corn oil, sunflower seed oil, polyethylene glycol, or other high molecular weight organics. The stripping fluid may also be composed of a mixture of two or more of these fluids.

The phrase "a loaded stripping fluid" describes a stripping fluid containing VHAPS/VOCs extracted from the gas stream. In use, generally a stripping fluid will be "loaded" after the stripping fluid has passed through the separation module and before it has exited the biomembrane reactor. The phrase "a lean stripping fluid" describes a stripping fluid after it has given up its load of VHAPs/VOCs in the biomembrane reactor. In one embodiment of the invention, essentially all of the VHAPs/VOCs are extracted from the loaded stripping fluid and are degraded by the biomembrane. The lean stripping fluid resulting in this particular embodiment retains essentially no VHAPs/VOCs. In an alternate embodiment, described in more detail below, the biomembrane reactor is operated such that less than all of the VHAPs/VOCs in the loaded stripping fluid are extracted and degraded by the biomembrane, and the resulting lean stripping fluid retains at least a portion of the VHAPs/VOCs that were present in the loaded stripping fluid fed into the biomembrane reactor.

Biotreatment.

In the biomembrane reactor, cells are immobilized within a biofilm attached to the surface of a microporous hydrophobic membrane. Cells exit the biofilm either through shear or sloughing. These films introduce diffusional resistance to the transport of substrates and waste products, altering the local environment to which the cell responds. In some cases, such films have been found to concentrate certain metabolites through a partitioning process similar to that between two distinct phases.

The biomembrane reactor is a shell-type unit containing inlet and outlet openings for the stripping fluid and for an aqueous nutrient medium in which the microorganisms are grown. In addition, the biomembrane reactor houses a second microporous hydrophobic membrane. As discussed previously for the separation module, the microporous hydrophobic membrane in the biomembrane reactor can be composed of polymeric materials, e.g., polyethylene, polypropylene, polyethylene terephthalate. It will be understood by those skilled in the art that the foregoing list of materials is merely exemplary and that any hydrophobic polymeric material can be utilized. The membranes can be composed of hollow fibers or flat sheets.

In one embodiment of the invention, the stripping fluid stream occupies the space inside a hollow fiber membrane and the aqueous nutrient medium occupies the shell-space outside the membrane. Alternately, the phases can be reversed and the aqueous nutrient medium can occupy the space inside the hollow fiber membrane and the stripping fluid stream occupies the shell space. In another embodiment of the invention, the stripping fluid occupies the space on one side of a flat sheet membrane, and the aqueous nutrient medium occupies the other side of the membrane. In any of these embodiments, there is a liquid—liquid interface between the stripping fluid and the nutrient medium within the pores of the microporous membrane. The microorganisms immobilized within the biofilm grow on the surface of the membrane in contact with the aqueous nutrient medium.

In a preferred embodiment of the invention, the biomembrane reactor contains Hoechst Celanese LIQUI-CEL® units, which contain CELGARD® membranes.

In another preferred embodiment of the invention, the membrane surface that contacts the biofilm is coated with a nonporous semipermeable membrane. Acceptable nonporous semipermeable membranes include those composed of polymers. Acceptable polymers include, but are not limited to, silicone rubber (polydimethyl siloxane), polyvinyl chloride, nitrile rubber, neoprene, and silicone polycarbonate. While not wishing to be bound by any particular theory of the invention, it is believed that transfer of volatile organic compounds across coated membranes occurs by a combination of pertraction and diffusion; the volatile organic compounds cross the nonporous semipermeable membrane by pertraction and then cross the microporous hydrophobic membrane by diffusion through the pore-filling liquid.

Exemplary effective pore sizes for the microporous membranes in the biomembrane reactor are 0.01 to 0.1 $\mu$m, more preferably 0.02 to 0.06 $\mu$m. There are competing factors to consider in selecting the pore size of the microporous membrane for the biomembrane reactor. Increasing pore size increases flux of volatile organic compounds from the stripping fluid across the membrane into the aqueous nutrient medium. Large pores can be problematic with uncoated microporous membranes, however, because as pore size increases a greater over-pressure must be applied to the aqueous nutrient medium to retain the liquid—liquid interface within the membrane pores.

The over-pressure applied to the aqueous nutrient medium is selected so as to stabilize the liquid—liquid interface within the membrane. There is no particular lower or upper limits to the over-pressure that can be applied to achieve this end. Over-pressure may be as low as 5, 4, 3, or 2 psi (34, 28, 21, or 14 kPa) or lower. Likewise, over-pressures of 5, 6, 7, or 10 psi (34, 41, 48, or 69 kPa) are acceptable.

The necessity of providing an over-pressure to retain the liquid-liquid interface within the membrane pores is avoided if one of the membrane surfaces, preferably the surface that contacts the nutrient medium phase, is coated with a nonporous semipermeable membrane. Because of its nonporous nature, the membrane acts as a seal, and the interface cannot break out of the membrane. As a result, no over-pressure and larger effective pore sizes are possible with such coated membranes. Exemplary effective pore sizes for coated membranes are 0.01 to 0.45 $\mu$m, preferably 0.03 to 0.3 $\mu$m, more preferably 0.03 to 0.2 $\mu$m.

The VHAPS/VOCs in the loaded stripping fluid are provided to the biomembrane reactor, where they are extracted across the microporous hydrophobic membrane into the aqueous nutrient medium and are degraded by the microorganisms. The microorganisms selected for use in the biomembrane reactor utilize the extracted organic compounds as a carbon source, thereby degrading (ie., metabolizing) the organic compounds to carbon dioxide, water, and cell mass.

The step of providing a loaded stripping fluid to the biomembrane reactor is typically a continuously providing step. "Continuously providing" means that the loaded stripping fluid is provided in a stream as opposed to a bulk feed. By "continuously" it is not meant that the stripping fluid stream is constant or uninterrupted. In some embodiments of the invention, the flow of loaded stripping fluid into the biomembrane reactor can be interrupted or shut off for a period of time.

In one preferred embodiment of the invention, the biomembrane reactor is operated at times so as to achieve less than complete extraction of the VHAPs/VOCs in the loaded stripping fluid. As explained in more detail below, VHAPS/VOCs that are not removed from the stripping fluid in the biomembrane reactor can be stored in a storage vessel and recycled through the separation module and biomembrane reactor at a later time. In this manner, the microorganisms are buffered from oscillations in plant operations or incoming pollutant concentrations in the gas stream.

Methods of culturing microorganisms are well-known in the art. Likewise, microorganisms can be grown in any suitable nutrient medium that supports cell growth and function; such suitable media are known to those skilled in the art.

Microorganisms are selected on the basis of their ability to degrade the volatile organic compounds of interest in the gas stream being fed into the system. Any naturally-occurring microorganism or mixture thereof can be used in the practice of the present invention. A single strain of microorganism or a consortium of two or more strains of microorganisms may be used to degrade an organic compound present in a particular gas stream. In a preferred embodiment of the present invention, the microorganisms employed are comprised of a bacterial strain, more preferably a consortium of bacterial strains.

A naturally-occurring microorganism includes those which have been isolated from nature, and which have been enriched or selected for a particular trait. Illustrative traits for which one might select include: increased growth rate, favorable growth characteristics, or altered substrate utilization, preference, or degradation. Methods of selecting microorganisms exhibiting a particular trait are well-known in the art.

A naturally-occurring organism also includes those which have been isolated from nature, and into which a foreign gene has been introduced, where such foreign gene confers a selectable trait. A foreign gene may be introduced by natural means, such as by conjugal transfer, or by recombinant DNA technology. Illustrative traits for which one might select include: increased growth rate, favorable growth characteristics, or altered substrate utilization, preference, or degradation. Methods of achieving conjugal transfer of genetic material are known in the art. The production and use of cloned genes, recombinant DNA, vectors, transformed host cells, selectable markers, proteins, and protein fragments by genetic engineering are also well-known to those skilled in the art.

Microorganisms that can be used in the present invention include both procaryotic and eucaryotic organisms. Exemplary microorganisms include, but are not limited to bacteria, cyanobacteria, and yeast. Methods and growth media for culturing these organisms are known in the art.

Exemplary bacterial species include both gram negative and gram positive bacteria. Such gram positive bacteria include, but are not limited to, Micrococcus species, Rhodococcus species, Bacillus species, Pasteurella species, Staphylococci species, and Streptococcus species. Gram negative bacteria include, but are not limited to, *Escherichia coli*, Pseudomonas species, Comomonas species, and Salmonella species.

Storage Vessel.

One advantage of the present invention is that it uncouples waste generation from biotreatment, such that operation of the biomembrane reactor can be continuous and optimized independently of plant work schedules or fluctuations in pollutant concentrations entering the system. This feature obviates many of the disadvantages associated with other VHAP/VOC treatment systems.

In one embodiment of the invention, the storage vessel is situated after the biomembrane reactor, and the lean stripping fluid flows from the biomembrane reactor and into the storage vessel, from where it is eventually recycled to the separation module. The stripping fluid may be temporarily stored in the storage vessel prior to being recycled. The flow of the loaded stripping fluid through the biomembrane reactor can be adjusted so as to decrease mass transfer of organic compounds across the membrane for degradation by the resident microorganisms. In this manner, undegraded organic compounds will bypass the microorganisms and will be stored with the stripping fluid in the storage vessel for recycling through the system and eventual removal and degradation in the biomembrane reactor.

The ability to control the rate of pollutant degradation or bypass in the biomembrane reactor greatly enhances the flexibility of the present invention. The overall pollutant load that will be fed into the system for a day, week, or any period of time can be calculated. The flow rate through the biomembrane reactor can be fine-tuned so as to achieve the desired partition of VHAPS/VOCs in the stripping fluid between degradation by the microorganisms and bypass to the storage vessel.

In an alternate embodiment of the invention, a storage vessel is placed before the biomembrane reactor. With the storage vessel situated before the biomembrane reactor, it can be utilized in two non-exclusive ways. First, stripping fluid and volatile organic acids can be stored and recycled through the storage vessel, as described previously for a configuration wherein the storage vessel is placed after the biomembrane reactor. Second, all or a portion of the loaded stripping fluid exiting the separation module can be retained in the storage vessel prior to entering the biomembrane reactor. Alternately, the present invention can be carried out with two storage vessels, one placed before and one placed after the biomembrane reactor. Furthermore, the storage vessels may be modified so that mixing of the contents occurs.

In one embodiment of the invention, the flow of the gas stream into the system is sometimes interrupted. Interruptions can be either complete or partial, for example, during plant down-time or periods when gas flow is reduced. In carrying out this embodiment of the invention, the loaded stripping fluid in the storage vessel can be metered directly into the biomembrane reactor so as to maintain a flow of organic compounds to the microorganisms, thereby buffering the microorganisms from fluctuations in pollutant generation. The flow of volatile organic compounds from the storage vessel into the biomembrane reactor can be readjusted when the gas stream flow into the system is restored, i.e., resumed.

In alternate embodiments, the invention is carried out so that the flow of loaded stripping fluid into the treatment module is stopped (i.e., the biomembrane reactor is shut-down), and is later restarted. In a preferred embodiment, the microorganisms are acclimated to the shut-down and start-up by gradually decreasing or increasing, respectively, the rate of volatile organic compound delivery to the biomembrane reactor prior to shut-down or start-up. The rate of organic compound delivery can be adjusted by changing the flow rate of the loaded stripping fluid into the biomembrane reactor or the concentration of volatile organic compounds in the loaded stripping fluid, or both. More preferably, the rate change is a gradient change, i.e., not an abrupt shift to the new delivery rate. More preferably still, the gradient change is a step-wise gradient. These gradient changes further buffer the microorganisms from fluctuations in organic compound availability.

Advantages of the Present Invention.

The present invention offers unique advantages over prior control methods. Depending on the circumstances, these advantages include one or more of: (1) MBT technology provides a method of pollutant destruction in the biomembrane reactor. (2) The processes for the removal and the destruction of pollutant compounds are separated, thereby allowing each to be designed and operated for maximum efficiency. Equipment size is minimized under these conditions. (3) The MBT System is highly adaptable to individual plants. The membrane separation units are modular in nature, which allows the pollutant removal process to be tailored to site-specific operating methods and regulatory permit requirements. Selection and optimization of suitable microorganisms ensure effective degradation of site-specific VHAPs/VOCs. (4) The storage vessel allows the MBT System to operate continuously or discontinuously. For example, some manufacturing schedules are single shift, resulting in eight hours of waste generation followed by sixteen hours of down time. Many of the problems associated with biofilters arise from starvation of the resident microorganisms during plant down-time and the lag in biodegradation following the recommencement of feeding. These oscillations in biofilter performance are unacceptable under EPA regulations. In the present invention, waste generation is uncoupled from biotreatment, allowing the biotreatment process to operate independently of manufacturing schedules and at optimal levels.

Applications of the Present Invention.

The present invention is useful for addressing a wide scope of problems related to air pollution control and prevention, such as hazardous vapor emissions from industrial processes. Such industrial processes include those employed in the surface coating industries, such as furniture finishing, plywood and particle board manufacturing. Hazardous exhaust gases are also produced from processes for metal coating, foamed polymer manufacture, fabric dying and coating, solvent cleaning, injection molding and polymer extrusion, polymeric fiber production, pulp and paper manufacture, chemical production, petroleum production, and wood preservative treatment. In addition, the present invention provides a method of controlling livestock and poultry farm odor by treating exhaust gases from livestock and poultry operations. Other applications of the present invention are as methods of site remediation, including treatment of soil venting gases.

The present invention is explained in greater detail in the following non-limiting Examples.

EXAMPLE 1

Model Plant Development

After examining data collected during site visits and in facility usage reports, it was determined that it would be possible to create one list of compounds which would be representative of the major VHAP/VOC emissions throughout the furniture industry. In addition, it was noted that relative amounts of each compound were consistent between similar products from different coating manufacturers. This allowed calculation of the amount of each compound as compared to total facility emissions. The list of compounds which was adopted as the model plant emission spectrum is given in Table I.

From the VHAPs/VOCs which are presented in the model emission spectrum in Table I, major chemical species were identified. Representative compounds from each species were then chosen for examination in further studies. The major species and representative compounds examined are shown in Table II.

TABLE I

SPECIATED MODEL PLANT COMPOUNDS

| Compound | HAP | % Total VOC | % Total HAP |
|---|---|---|---|
| Acetone |  | 1.85 |  |
| Acrylic Resin |  | 0.83 |  |
| Butanol | YES | 3.97 | 8.92 |
| 2-Butoxyethanol | YES | 1.99 | 4.47 |
| Diethylene glycol monoethyl ether | YES | 0.22 | 0.50 |
| Ethanol |  | 2.62 |  |
| Ethylene glycol | YES | 0.20 | 0.44 |
| Formaldehyde | YES | <.10 | <.10 |
| Hydrocarbon (aliphatic) |  | 0.59 |  |
| Isobutyl Acetate |  | 17.00 |  |
| Isobutyl isobutyrate |  | 3.61 |  |
| Isopropanol |  | 7.47 |  |
| Methanol | YES | 16.62 | 37.37 |
| Methyl ethyl ketone | YES | 5.61 | 12.62 |
| Methyl isobutyl ketone | YES | 1.25 | 2.82 |
| Methyl n-amyl ketone |  | 6.21 |  |
| Naptha (aliphatic) |  | 9.06 |  |
| Naptha (aromatic) |  | 1.24 |  |
| Naptha (VM&P) |  | 0.49 |  |
| Toluene | YES | 13.10 | 29.46 |
| Xylenes | YES | 5.26 | 11.84 |

TABLE II

REPRESENTATIVE COMPOUNDS OF THE MAJOR CHEMICAL SPECIES PRESENT IN THE MODEL PLANT EMISSIONS

| Species | Representative Compounds |
|---|---|
| Single carbon compounds | Methanol |
| Alcohols | Ethanol |
| Ketones | Methyl ethyl ketone |
| Acids | Isobutyl acetate |
| Aromatics | m-Xylene |

EXAMPLE 2

Mass Transfer Experiments

The underlying principle of the MBT System is chemical equilibrium. Equilibrium in an environment is achieved when sufficient contacting between its constituents has occurred. This process may take hours in a sealed flask, or it may occur very quickly, as in the case of ideal packed or tray tower absorbers. Equilibrium is approached quickly in an absorber due to the large surface area available for intimate contact and mixing between phases. While industrial absorbers do not achieve actual equilibrium operation, it still governs their performance. Using equilibrium data, operating parameters can be obtained for a specified transfer of solute between absorber phases. MBT technology works in much the same way. VHAPs/VOCs are transferred from air into the stripping fluid based upon the fact that, at equilibrium, they partition preferentially into the fluid.

In the studies presented herein, VHAPs/VOCs were extracted across a Hoechst Celanese LIQUI-CEL® membrane module, which provides surface area for phase contact so that specified operating efficiencies may be obtained. LIQUI-CEL® modules are configured like shell and tube heat exchangers, with a bundle of CELGARD® uncoated hydrophobic hollow fibers (tubes) contained inside the length of a cylindrical enclosure (shell). Because the fibers are hydrophobic, they are wet by organic liquids and not water. Typically, a gas feed stream is run through the fibers while an organic solvent (stripping fluid) is pumped in counter current cross-flow through the shell. Contact between phases occurs inside the fiber pores which are filled with the organic fluid. Mass transfer takes place at this interface, and is driven toward chemical equilibrium. Because the fibers in the LIQUI-CEL® modules are uncoated, steady-state operation of LIQUI-CEL® modules requires that an over-pressure be applied to the feed stream. This stabilizes the phase interface and keeps the organic from breaking through the pores. High rates of mass transfer are achieved because of the high surface area to volume ratio inside the units. FIG. 3 details phase contact in the pores.

EXAMPLE 3

Partition Coefficients for Stripping Fluids

Before beginning work with the LIQUI-CEL® membrane modules presented in Example 2, partition coefficient experiments were performed to investigate the equilibrium distribution of m-xylene, MEK, and MIBK between phases for stripping fluid/air. Octanol was chosen as the stripping fluid because data from previously conducted studies was readily available for comparison.

Partition coefficients are defined as a measure of the affinity a solute has for one phase over another at equilibrium. Therefore, they are an integral part of equations related to membrane contactor design and operation. Partition coefficients are expressed as a ratio of concentrations; the general form being (concentration in solvent)/(concentration in air).

For these studies, two forms of the partition coefficient were used. The first was the general form, which indicated the level of driving force for mass transfer (a value greater than 1 indicates sufficient driving force). The second form was defined as 1/(general form), or $1/P_{gen}$, which was used in system operating equations. Values at different temperatures for the general form of the partition coefficient are given in Table 3.

An additional set of experiments was run to evaluate stripping fluids other than octanol. This was due mainly to the relatively high cost of commercially available octanol. Partition coefficients were determined for m-xylene in several natural oils at 31° C. These results are presented in Table 4. The partition coefficients for m-xylene in the natural oils evaluated were comparable to those for octanol. The purchase cost of these oils is roughly one-quarter that of octanol.

TABLE 3

PARTITION COEFFICIENT VALUES

| Temp. | Partition Coef. [oct]/[air] | | | Partition Coef. [oct]/[water] | | |
|---|---|---|---|---|---|---|
| (° C.) | m-xylene | MEK | MIBK | m-xylene | MEK | MIBK |
| 6 | 9,865 | 2,181 | ∞ | NA | NA | NA |
| 22 | 7,978 | 1,634 | 22,045 | NA | NA | NA |
| 31 | 7,703 | 1,344 | 8,721 | 1,021 | 33 | 2.1 |

TABLE 4

PARTITION COEFFICIENT FOR
m-XYLENE IN NATURAL OILS AT 31° C.

| Compound | Partition Coef. [solvent]/[air] |
|---|---|
| Corn oil | 8,283 |
| Sunflower seed oil | 8,244 |
| Mineral oil | 7,284 |

EXAMPLE 4

Mathematical Model

Once partition coefficients were obtained and it was established that a sufficient driving force for transfer of the representative compounds from air to octanol existed, a series of operating equations were derived to describe the membrane separation processes for uncoated microporous hollow fiber membranes. The final result for the membrane separation unit in the separation module was a design equation (Equation 2 below) which related concentration, partition coefficient, membrane surface area, and flow rate to an overall mass transfer coefficient, $K_o$. An analogous equation was obtained for the biomembrane, relating membrane module parameters to an overall mass transfer coefficient, $K_w$.

The overall mass transfer coefficients are based upon overall system driving forces, and are defined by a sum of resistances model. This model, for uncoated microporous hollow fibers, takes into account resistances to mass transfer in individual steps of the separation process. In order for solute transfer from one phase to another to occur, the solute must pass through three discrete and sequential steps. This is shown graphically for the separation module in FIG. 6.

Figure 6:
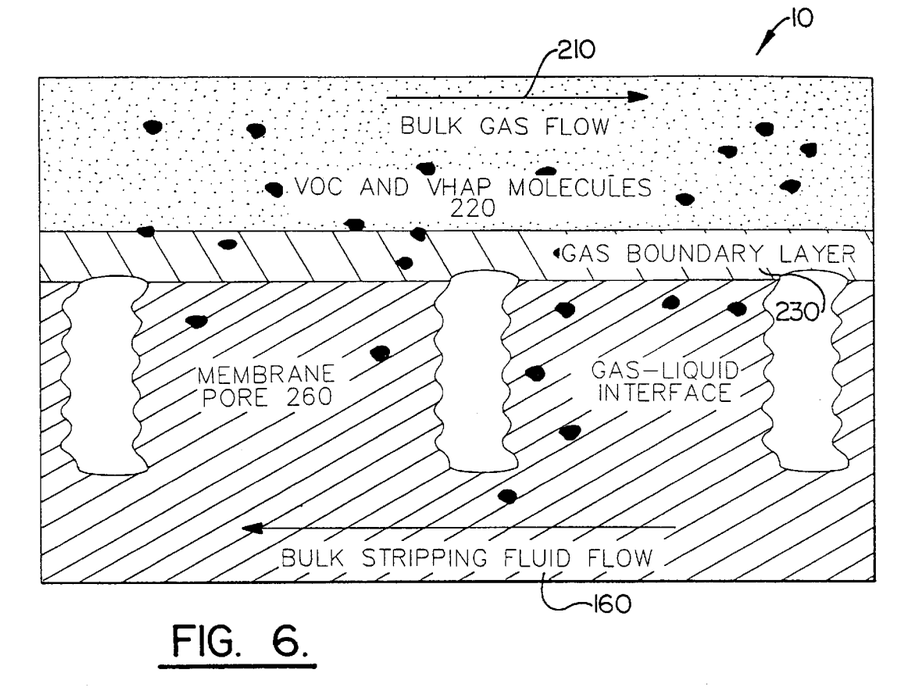
FIG. 6 demonstrates the steps involved in mass transfer of volatile organic compounds from the gas stream to the stripping fluid in the separation module.

Turning to the cross-section of the separation module 10 in FIG. 6, the VHAP/VOC molecules 220 present in the gas stream 210 are extracted into a stripping fluid 160 flowing on the other side of the hydrophobic microporous membrane. The VHAP/VOC molecules 220 must first diffuse through the gas boundary layer 230. Second, they must diffuse across the gas-liquid interface 240. And third, they must diffuse through the fluid residing in the membrane pores 260.

Each of the above steps provides a resistance to mass transfer, given by 1/k. The sum of these resistances may be written as:

Equation 1:

$$1/K_o = 1/k_g + 1/Pk_f + 1/Pk_m$$

where k values are individual mass transfer coefficients for the gas, the liquid, and the membrane, respectively. P is the stripping fluid phase partition coefficient.

The partition coefficient is an important quantity in the design equation. The design equation may be written as:

Equation 2:

$$A_m = \frac{\ln\left[\left(\frac{C_A^2}{P} - C_0^2\right) \div \left(\frac{C_A^1}{P} - C_0^1\right)\right]}{K_0\left(\frac{1}{Q_0} - \frac{1}{Q_A P}\right)}$$

where the subscripts A and O denote the air and octanol phases, and the superscripts 1 and 2 represent inlet and outlet conditions, respectively. P is the air/octanol equilibrium partition coefficient, Q is the volumetric flow of the respective phases and $A_m$ is the membrane surface area.

By having controlled values for each variable in the design equations except the overall mass transfer coefficients, their values were calculated and compared to experimental data for validation. Using the measured form 2 partition coefficient for m-xylene, $P_{air/oct}$=0.00014 for the air/stripping fluid separation unit, as described in Example 3, it was determined that $K_o$=8.2×10$^{-6}$ cm/sec. Similarly, for the biomembrane unit, it was determined that $K_w$=6.5×10$^{-3}$ cm/sec.

EXAMPLE 5

Membrane Separation Unit Experiments

A membrane separation system was constructed which allowed contacting of an m-xylene laden air stream with an octanol solvent inside a LIQUI-CEL® hollow fiber module. The entire membrane separation system used in these experiments is shown schematically in FIG. 7. All tubing was copper or stainless steel. m-xylene was chosen as the representative compound for mass transfer studies because it represented the "worst case" compound among the main categories of model chemical species, i.e., m-xylene is resistant to degradation.

Figure 7:
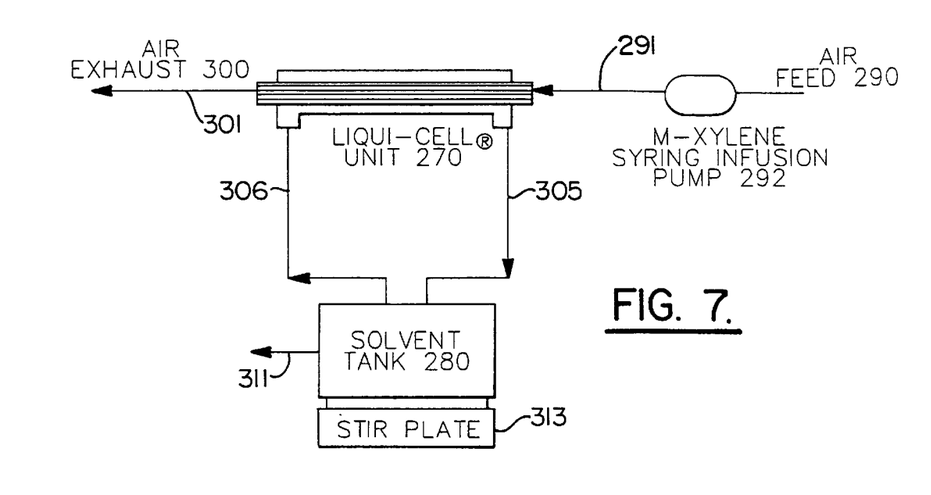
FIG. 7 is a schematical representation of the experimental system employed to test and optimize the membrane separation unit.

Turning to FIG. 7, air feed 290 is directed by line 291 to a LIQUI-CEL® unit 270. The air feed 290 is infused with m-xylene from a syringe infusion pump 292 prior to entering the LIQUI-CEL® unit 270. Air exhaust 300 exits the LIQUI-CEL® unit 270 by line 301. Stripping fluid exits the LIQUI-CEL® unit 270 through line 305 into a solvent tank 280 on a stir plate 313. The stripping fluid flows out of the solvent tank 280 by line 306 to the LIQUI-CEL® unit 270. Effluent from the solvent tank 280 is removed by line 311.

In the experiments described herein, octanol was passed through the membrane separation unit's shell space while air flowed through the fibers. The two phases were contacted in counter current cross flow. The octanol reservoir was run in recycle while air was allowed only a single pass through the system. Air flow rates were varied between 10 and 40 liters per minute, resulting in a minimum gas/membrane contact time of 0.004 seconds. The pressure drop across the membrane unit ranged from 0.5 to 2.0 psi (approximately 3 to 14 kPa), and the surface area available for mass transfer was 1.4 square meters.

EXAMPLE 6

Results of Membrane Separation Unit Experiments

Results of experiments with the apparatus in FIG. 7 showed that m-xylene could be successfully transferred from air to octanol inside the membrane unit. Also, a dependence of $K_o$ on octanol (solvent) flow rate was discovered. This observation indicated that m-xylene transfer to the octanol was the controlling system resistance. By increasing the octanol flow rate, and hence the turbulence (mixing) in the octanol stream, this resistance was lowered and an increased value of $K_o$ (rate of mass transfer) was obtained. While holding the air flow constant at 20 L/min and varying the octanol flow from 0.12 to 0.56 L/min, values of $K_o$ increased from 3.1×10$^{-6}$ to 1.03×10$^{-5}$ cm/s.

EXAMPLE 7

Biodegradation Experiments

Using a mixed consortium of organisms isolated in liquid culture from soil samples removed from a site saturated with gasoline for a number of years, the model compounds from each of the represented species in furniture exhaust gases were examined for degradability. Results are shown in Table 5. Degradability actually refers to the ability of the microorganisms to utilize a compound as a carbon source for growth and energy. Different carbon sources are preferred by different organisms, so it was important to determine which model compounds were acceptable for the consortium which was isolated. Following completion of these initial studies, organism subcultures were generated for specific compounds. By enrichment of the initial gasoline consortium with isobutyl acetate (IBA), methanol (MeOH), MEK, MIBK, meta-xylene, and para-xylene in individual flasks, cultures capable of degrading each compound were developed.

Pure bacterial cultures (single identifiable organisms) were established on meta- and para-xylene; the other cultures consisted of approximately three different bacterial strains each. Maximum growth rates for the isolated consortia were determined in shake flask studies containing minimal media and supplemented with the appropriate compound. Concentrations of volatile organic compounds added to the flasks were 400 ppm (mole/mole) for MEK and MIBK, 150 ppm for m-xylene and p-xylene, and 2000 ppm for IBA and methanol. Growth rates obtained for the cultures on each of the carbon sources are given in Table 6. The growth rate on o-xylene was relatively slow compared with that on other compounds.

TABLE 5

GROWTH SUBSTRATES FOR ISOLATED SOIL CONSORTIA

| Compound | Degradability |
| --- | --- |
| Acetone | Yes |
| n-Butyl alcohol | Yes |
| Ethanol | Yes |
| Formaldehyde | Yes |
| Isobutyl alcohol | Yes |
| Methyl ethyl ketone | Yes |
| Methanol | Yes |
| Methyl isobutyl ketone | Yes |
| Styrene | Yes |
| Toluene | Yes |
| m-Xylene | Yes |
| o-Xylene | Yes |
| p-Xylene | Yes |

TABLE 6

GROWTH RATES OF ISOLATED CONSORTIA

| Organism(s) | Specific Growth Rate | Degradation Rate |
|---|---|---|
| mx-2 | 0.46 hr$^{-1}$ | 3.60 * 10$^{-10}$ mg/(hr – cell) |
| + 0.2% MeOH | 0.45 hr$^{-1}$ | 3.57 * 10$^{-10}$ mg/(hr – cell) |
| + 0.2% EtOH | 0.40 hr$^{-1}$ | 2.34 * 10$^{-10}$ mg/(hr – cell) |
| + 500 ppm octanol | 0.46 hr$^{-1}$ | 3.60 * 10$^{-10}$ mg/(hr – cell) |
| 500 ppm octanol | 0.20 hr$^{-1}$ | NA |
| iba (consortium) | 0.16 hr$^{-1}$ | NA |
| mek (consortium) | 0.13 hr$^{-1}$ | NA |
| mibk (consortium) | 0.17 hr$^{-1}$ | NA |
| meoh (consortium) | 0.15 hr$^{-1}$ | NA |

EXAMPLE 8

Mixed Carbon Source Studies

The effects of carbon source composition were examined for the mx-2 bacterial strain. mx-2 is one of the strains of microorganism isolated from soil samples exposed to gasoline as described in Example 7. It was determined that the effect on the growth rate of either a readily metabolized carbon source (ethanol) or a non-metabolized carbon source (methanol) was negligible (see Table 6). Ethanol lowered the maximum growth rate by only 10%, while methanol had no effect. Though growth rate was not effected, the degradation rate of m-xylene in the presence of ethanol was reduced by about 30%.

In addition to examining the effects of ethanol and methanol, the impact of octanol on microorganism growth was determined. This investigation was necessary since some octanol (stripping fluid) will be delivered to the membrane bioreactor with the VHAPs/VOCs. Octanol had no effect on the growth or degradation rate of the test microorganism strain grown on m-xylene.

EXAMPLE 9

Substrate Range Studies

Experiments were conducted to examine the range of compounds degraded by enzymes present in the metabolic pathways of the strains established on meta- and para-xylene, as described in Example 7. As shown in Table 7, many compounds which are typically difficult to biodegrade were successfully removed by these strains of microorganisms. Higher values for oxygen uptake indicate that a compound is being more rapidly degraded. The compounds listed Table 7 from benzoate through protocatechuate are enzymatic pathway intermediates in the oxidation of aromatic compounds.

TABLE 7

OXYGEN UPTAKE RATES FOR VARIOUS SUBSTRATES

| | Oxygen Uptake, $\mu$mol/min-mg total protein | |
|---|---|---|
| Substrate | Strain px-2 | Strain mx-2 |
| p-Xylene | 0.34 | 1.21 |
| m-Xylene | 0.31 | 0.82 |
| o-Xylene | NA | 0.31 |
| Toluene | 0.17 | 0.18 |
| Benzene | 0.13 | 0.27 |

TABLE 7-continued

OXYGEN UPTAKE RATES FOR VARIOUS SUBSTRATES

| | Oxygen Uptake, $\mu$mol/min-mg total protein | |
|---|---|---|
| Substrate | Strain px-2 | Strain mx-2 |
| Styrene | 0.47 | 0.55 |
| Benzoate | 2.34 | 0.66 |
| Catechol | 5.19 | 1.23 |
| 3-Methylcatechol | 1.50 | 1.17 |
| 4-Methylcatechol | 4.35 | 0.92 |
| Protocatechuate | 0.00 | 0.32 |

The foregoing examples are illustrative of the present invention, and are not to be construed as limiting thereof. The invention is defined by the following claims, with equivalents of the claims to be included therein.

That which is claimed:

1. A process for removing a volatile organic compound from a gas stream, said process comprising the steps of:
    providing a gas stream containing a volatile organic compound therein to a separation module, said separation module having a gas stream inlet opening, a gas stream outlet opening, and a gas stream channel therebetween, said separation module containing a first microporous hydrophobic membrane;
    extracting said volatile organic compound across said first microporous hydrophobic membrane into a lean stripping fluid to produce a loaded stripping fluid;
    providing said loaded stripping fluid to a treatment module, said treatment module comprising a second microporous hydrophobic membrane having first and second opposing surface portions, with said loaded stripping fluid contacting said first surface portion, and with microorganisms immobilized on said second surface portion, said treatment module having a nutrient medium inlet opening and a nutrient medium outlet opening formed therein, a nutrient medium being provided to said microorganisms in said treatment module by said nutrient medium inlet opening;
    extracting said volatile organic compound from said loaded stripping fluid across said second microporous hydrophobic membrane to said microorganisms to produce a lean stripping fluid;
    degrading said volatile organic compound extracted across said second microporous hydrophobic membrane with said microorganisms.

2. A process according to claim 1, further comprising the step of recycling at least a portion of said lean stripping fluid from said treatment module to said separation module.

3. A process according to claim 2, further comprising the step of storing at least a portion of said lean stripping fluid prior to said recycling step.

4. A process according to claim 1, wherein said first microporous hydrophobic membrane has a nonporous semipermeable membrane carried by one surface thereof.

5. A process according to claim 4, wherein said nonporous semipermeable membrane is formed from a polymer.

6. A process according to claim 5, wherein said polymer is selected from the group consisting of silicone rubber (polydimethyl siloxane), polyvinyl chloride, nitrile rubber, neoprene, and silicone polycarbonate.

7. A process according to claim 1, wherein said first microporous hydrophobic membrane is comprised of hollow fibers.

8. A process according to claim 1, wherein said first microporous hydrophobic membrane is comprised of flat sheets.

9. A process according to claim 1, wherein said second microporous hydrophobic membrane has a nonporous semipermeable membrane carried by one surface thereof.

10. A process according to claim 1, further comprising the step of pressurizing said gas stream prior to said step of providing said gas stream to said separation module.

11. A process according to claim 10, wherein said gas stream is provided to said separation module gas stream inlet opening at a pressure of at least 2 pounds per square inch (14 kiloPascals).

12. A process according to claim 1, further comprising the step of pressurizing said nutrient medium prior to providing said nutrient medium to said microorganisms in said treatment module.

13. A process according to claim 12, wherein said nutrient medium is provided to said treatment module nutrient medium inlet opening at a pressure of at least 2 pounds per square inch (14 kiloPascals).

14. A process according to claim 1, wherein at least a portion of said volatile organic compounds are not extracted across said second microporous hydrophobic membrane.

15. A process according to claim 14, further comprising the step of recycling at least a portion of said volatile organic compounds that are not extracted across said second microporous hydrophobic membrane from said treatment module to said separation module.

16. A process according to claim 15, further comprising the step of storing at least a portion of said volatile organic compounds that are not extracted across said second microporous hydrophobic membrane prior to said recycling step.

17. A process according to claim 1, wherein said volatile organic compound is selected from the group consisting of acetones, anilines, benzene, butanol, 2-butoxyethanol, diethylene glycol monoethyl ether, ethanol, ethyl benzene, ethylene glycol, formaldehyde, isobutyl acetate, isobutyl isobutyrate, isopropanol, methanol, methyl ethyl ketone, methyl isobutyl ketone, methyl n-amyl ketone, naptha compounds, toluene, and xylene.

18. A process according to claim 1, wherein said volatile organic compound is selected from the group consisting of anilines, chlorinated organic compounds, and nitrated organic compounds.

19. A process according to claim 1, wherein said gas stream is generated from a surface-coating operation.

20. A process according to claim 1, wherein 70 to 95% of said volatile organic compounds are extracted from said gas stream.

21. A process according to claim 1, wherein said volatile organic compounds comprise 10 to 10,000 ppm (mole/mole) of said gas stream.

22. A process according to claim 1, wherein said stripping fluid comprises an oleophilic organic solvent.

23. A process according to claim 1, wherein said stripping fluid is selected from the group consisting of octanol, corn oil, mineral oil, and sunflower seed oil.

24. A process according to claim 1, wherein said microorganisms are bacteria.

25. A process according to claim 1, further comprising the step of interrupting said step of providing a gas stream while simultaneously continuing said step of providing said loaded stripping fluid.

26. A process according to claim 25, further comprising the step of stopping a flow of said loaded stripping fluid into said treatment module.

27. A process according to claim 26, wherein said stopping step is followed by the step of restarting said flow of said loaded stripping fluid into said treatment module, said restarting step carried out so that the rate said volatile organic compound is provided to said treatment module follows an increasing gradient.

28. A process according to claim 27, wherein said increasing gradient is a step-wise gradient.

29. A process according to claim 25, further comprising the step of decreasing the rate at which said volatile organic compounds in said loaded stripping fluid are provided to said treatment module.

30. A process according to claim 29, in which said decrease in rate is achieved by a step-wise gradient.

31. A process according to claim 25, wherein said interrupting step is followed by the step of restoring said gas stream.

32. A process according to claim 25, wherein said interrupting step is a complete interrupting step.

33. A process according to claim 25, wherein said interrupting step is a partial interrupting step.

34. A process according to claim 1, wherein said stripping fluid comprises an oleophilic solvent.

* * * * *